(12) United States Patent
Garcia (10) Patent No.: US 7,006,607 B2
(45) Date of Patent: Feb. 28, 2006

(54) METHOD AND APPARATUS FOR RECORDING AND AUTOMATED PLAYBACK OF PERSONAL AGENT GREETINGS IN A COMMUNICATION-CENTER ENVIRONMENT

(75) Inventor: Gustavo Manuel Marin Damil Garcia, Rothesay (CA)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 0 days.

(21) Appl. No.: 10/228,495

(22) Filed: Aug. 26, 2002

(65) Prior Publication Data

US 2003/0007612 A1 Jan. 9, 2003

Related U.S. Application Data

(63) Continuation of application No. 09/538,112, filed on Mar. 29, 2000, now Pat. No. 6,442,247.

(51) Int. Cl.
*H04M 1/64* (2006.01)
*H04M 3/00* (2006.01)

(52) U.S. Cl. ............... 379/88.18; 379/88.11; 379/88.12; 379/88.17; 379/265.01; 379/265.02; 379/265.06; 379/265.09

(58) Field of Classification Search ............ 379/88.11, 379/88.12, 88.13, 88.17, 88.18, 900, 902, 379/908, 265.01, 265.02, 265.09, 266.01, 379/266.07, 266.06, 214.01, 265.06
See application file for complete search history.

(56) References Cited

U.S. PATENT DOCUMENTS

| | | | | |
|---|---|---|---|---|
| 4,623,761 A | | 11/1986 | Winter et al. | |
| 5,309,505 A | * | 5/1994 | Szlam et al. | 379/88.01 |
| 5,511,112 A | * | 4/1996 | Szlam | 379/266.06 |
| 5,544,232 A | * | 8/1996 | Baker et al. | 379/88.25 |
| 5,652,789 A | * | 7/1997 | Miner et al. | 379/201 |
| 5,729,593 A | | 3/1998 | Baker et al. | |
| 5,740,240 A | * | 4/1998 | Jolissaint | 379/265.02 |
| 5,848,143 A | * | 12/1998 | Andrews et al. | 379/219 |
| 5,946,386 A | * | 8/1999 | Rogers et al. | 379/265 |
| 6,385,646 B1 | * | 5/2002 | Brown et al. | 709/217 |
| 6,442,247 B1 | * | 8/2002 | Garcia | 379/88.18 |
| 6,456,709 B1 | * | 9/2002 | Cox et al. | 379/218.01 |
| 6,807,257 B1 | * | 10/2004 | Kurganov | 379/88.22 |

OTHER PUBLICATIONS

Viking Electronics, Telecommunications Peripheral Products, 1992 Catalog.*

* cited by examiner

Primary Examiner—Allan Hoosain
(74) Attorney, Agent, or Firm—Donald R. Boys; Central Coast Patent Agency, Inc (57) ABSTRACT

A system for presenting a recorded message on behalf of an agent receiving a call at an agent station in a call center, the agent station having a telephony interface for receiving calls and a personal computer with a video display unit (PC/VDU), has a telephony switching apparatus enhanced by a computer-telephony integration (CTI) processor, an Interactive Voice Response (IVR) system executing a voice treatment option (VTO) software, coupled to the telephony switching apparatus and the CTI processor; and a data repository having recorded messages stored on behalf of the agent and accessible to the CTI processor. The CTI processor routes incoming calls to the telephony interface for the agent, uses data associated with the calls for selecting appropriate recorded messages, and causes, by controlling the IVR, a retrieved recorded message to be played to a caller upon the agent picking up the routed call. The system is useful with both conventional telephone systems and data network telephony, such as over the Internet.

4 Claims, 5 Drawing Sheets

Automated PAG (IVR Driven)

Fig. 3

Enhanced PAG (Station Driven)

METHOD AND APPARATUS FOR RECORDING AND AUTOMATED PLAYBACK OF PERSONAL AGENT GREETINGS IN A COMMUNICATION-CENTER ENVIRONMENT

This is a Continuation of application Ser. No. 09/538,112, filed Mar. 29, 2000, now U.S. Pat. No. 6,442,247.

FIELD OF THE INVENTION

The present invention is in the field of telecommunications systems encompassing CTI and DNT-enabled communication centers, and pertains more particularly to methods and apparatus for allowing communication center agents to record specific messages for automated playback during active calls according to call parameters.

BACKGROUND OF THE INVENTION

The field of telecommunications has grown greatly with the advent of computer-integrated-telephony (CTI) and more recently, data-network-telephony (DNT). Contributions to both aforementioned technologies have led to the advent of multimedia communications centers capable of handling a wide variety of communication types and mediums.

A large customer-care center serves as a good example of a telecommunications center that may be dedicated to serving a vast customer base through constant communication using "state of the art" techniques aided by "intelligent software applications" running on processors connected to the centers telecommunication system.

A communication center of the type described in this specification employs a plurality of agents whom have been trained to operate communication equipment and applications for the dedicated purpose of serving customers whom are calling into the center.

A multimedia communication center enhanced with DNT capability as known to the inventor will include, along with a connection-oriented-switched-telephony (COST) system, an Internet protocol (IP) telephony system for handling communication events sourced from a data-packet-network (DPN) such as the well-known Internet. It will be appreciated by one with skill in the art that agent responsibilities in such a system are expanded over those of a traditional call-in center to include working with e-mails, video mails, IP voice calls, computer-aided chat sessions, and other computer/network aided communication mediums.

Agents are typically set-up at workstations adapted with equipment and network connections that are suitable for communication in both a COST and a DNT environment. For example, each agent station typically comprises a telephone connected to a central COST routing system and a personal computer with a video display unit (PC/VDU), the computer connected to a local-area-network LAN. The LAN is further connected to an IP routing system and agents receive IP calls routed to them over the LAN to their PC/VDU's. In some cases, DNT capable telephones are also incorporated such that they may be switched from COST mode to DNT mode and back again.

In addition to enhanced equipment utilized at agent level, other equipment is provided for the purpose of automated interface with customers calling into the system at network level. Such equipment includes interactive voice response (IVR) systems, which may be adapted for both COST and DNT communication. In systems known to the inventor, intelligent routing is available at levels above the agent level (internal routing system).

Software adaptation known to the inventor as Transaction-server or T-Server software is provided to run on processors implemented at switches and terminals existing in COST, and in some instances, DPN network levels for the purpose of providing intelligent routing routines to be executed at network level. These processors are interconnected with a separate DPN or other data network such that routing commands may be communicated between instances of T-Servers. Moreover, additional data may be obtained about a caller at network level and passed to agent level over the separate data network, many times ahead of a routed communication event.

Extending intelligent routing capability into the networks allows a communication center to perform "agent level routing" from within a network. These routing rules are, of course, adapted to communication center capability. For example, statistical call routing, predictive call routing, skill-based routing, priority routing and other routines known to the inventor may be utilized at network level.

Some communications centers employ agents who handle communication events for a variety of clients. Such an agent may be a sales agent, for example, that is responsible for products or services offered by several different companies. Moreover, there may be a group of such agents working from within one location or communication center set up to service the accounts of multiple organizations.

One challenge facing an agent servicing multiple, sometimes unrelated accounts from a single location is switching mentally from one enterprise to another during a fast-paced workday of answering calls. It is very easy for an agent working for multiple companies to mix up company identities during a heavy call load.

One solution that has been provided to agents working in multi-client communication centers known to the inventor involves a technique known as agent scripting. Agent scripting involves sending a pre-prepared script specific to a call associated with a client to an agent targeted to receive the call. The script may be a text greeting or some other specific script designed to be read to a customer. Such scripts are routed to and displayed on an agent's PC/VDU at the time of the related call. In this way, agents are prompted what to say (which script to use) based on pre-known information about the call, which is obtained before the actual call is routed to a target agent.

A problem with the above-described solution is that it requires agent participation in reading and reciting a script as it appears on his or her screen. During a fast-paced campaign wherein many different scripts are used, an agent may be vulnerable to errors. Especially so if two or more of the scripts are somewhat similar in composition. As a day progresses, it may be increasingly difficult for an agent to focus on a particular script after constant visual strain. This may cause uncomfortable delays between agents and customers, or worse, misidentification of a customer.

More recently, systems have been introduced that allow agents to pre-record messages for the purpose of playing them back to customers during interaction. In some cases, these pre-recorded messages are recorded in the agent's own voice. Such recordings are IVR driven and must be selected by the agent answering a call. For example, if an agent picks-up a call from a customer for ABC.COM, then that agent would select the appropriate pre-recorded message for ABC.COM and so on. The pre-recorded message plays for the customer and allows the agent some composure time (length of message) before engaging with the customer.

It is known to the inventor that Rockwell International Corporation of Costa Mesa, Calif. provides a system wherein an agent may record his/her own voice to play to callers, and e-share (URL WWW.eshare.com) allows multiple messages, but an agent must manually select messages to be played.

One drawback to the type of system described above is that an agent must manually select which message to play. Therefore, he or she must be actively engaged in call identification before picking up the call. This system, while a marked improvement over scripting, still requires much agent participation increasing a chance for error. Systems driven by IVR technology are available for both COST and DNT applications, but an agent must select which of multiple messages to play for each call.

What is clearly needed is a method and apparatus that would allow an agent to record multiple messages that are automatically selected for appropriate calls based on information about calls known to the communication-center system before final agent-level-routing (ALR) routing. A system such as this would allow an agent composure time before each call, would not require scripting, and would require no direct agent participation in selecting messages to play.

SUMMARY OF THE INVENTION

In a preferred embodiment of the present invention a system for presenting a recorded message on behalf of an agent receiving a call at an agent station in a call center, the agent station having a telephony interface for receiving calls and a personal computer with a video display unit (PC/VDU) is provided, the system comprising a telephony switching apparatus enhanced by a computer-telephony integration (CTI) processor; an Interactive Voice Response (IVR) system executing a voice treatment option (VTO) software, coupled to the telephony switching apparatus and the CTI processor; and a data repository having recorded messages stored on behalf of the agent and accessible to the CTI processor. The CTI processor routes incoming calls to the telephony interface for the agent, uses data associated with the calls for selecting appropriate recorded messages, and causes, by controlling the IVR, a retrieved recorded message to be played to a caller upon the agent picking up the routed call.

In some embodiments the telephony switching apparatus is a standard connection-oriented switched telephony (COST) telephone switch and the telephony interface is a COST telephone, while in others the telephony switching apparatus is a data-packet network (DPN) router, and the telephony interface is one of the PC/VDU or an Internet Protocol Network Telephony (IPNT)-enabled telephone. In still other cases both types of telephony are supported.

In a further embodiment there is a data repository storing data pertaining to callers, and the system provides whispered information to agents about callers, not audible to the callers, to aid the agents in dealing with calls. The system may also, in some embodiments use the stored customer data to select and provide instructions regarding customer importance and treatment to an agent engaged in a call with a customer.

In a further embodiment the system also has software executing on the PC/VDU at the agent station, the software providing a user/interface at the PC/VDU enabling the agent to record, edit, and store messages. In this embodiment the CTI processor apprises the agent of assignments upon the agent logging on at the agent station.

In a further aspect of the invention a method for presenting a recorded message on behalf of an agent receiving a call at an agent station in a call center, the agent station having a telephony interface for receiving calls, the system comprising steps of (a) storing the recorded messages in a repository accessible to a computer-telephony integration; (b) routing a call to an agent by a computer-telephony integration (CTI) processor controlling a telephony switching apparatus; (c) selecting, by the CTI processor, from a data repository having recorded messages stored on behalf of the agent and accessible to the CTI processor, a message to be played to a caller; and (d) upon the agent picking up the routed call, playing the message to the caller.

In embodiments of the invention, described in enabling detail below and with reference to the listed figures, for the first time a system is provided which greets callers automatically in a call center environment, and also allows an agent to record greetings and other messages and store them to be selected automatically by the system and played to callers.

DESCRIPTION OF THE PREFERRED EMBODIMENTS

Figure 1:
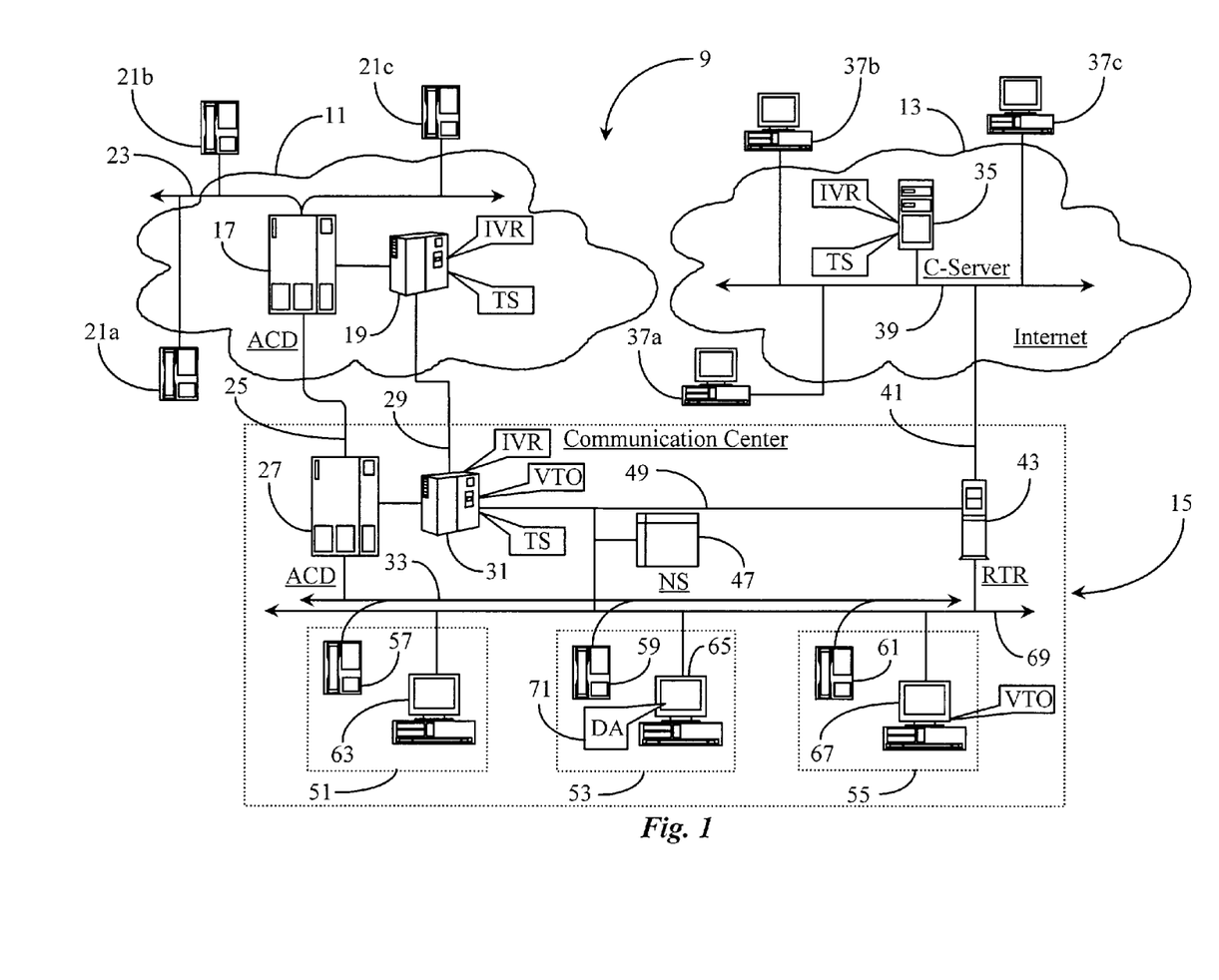
FIG. 1 is an overview of a communication-center environment wherein automated personalized agent greetings are utilized according to an embodiment of the present invention.

FIG. 1 is an overview of a communication-center environment 9 wherein automated personalized agent greetings are utilized according to an embodiment of the present invention. Environment 9 represents a communication network comprising a PSTN network 11, an Internet network 13, and a communication center 15.

PSTN 11 represents a COST telephony network as known in the art. In this example, a public network is represented, however, a private telephony network such as a private branch exchange (PBX) may also be used to practice the present invention. PSTN 11 is chosen as a preferred example because of a characteristic of high public accessibility.

Internet network 13 represents a data-packet-network (DPN) that is capable of carrying Internet Protocol Network Telephony (IPNT). A private network such as a corporate Intranet or private WAN may be represented instead of Internet 13 as long as IPNT is supported. The inventor chooses Internet 13 as a preferred example because of a characteristic of high public accessibility.

Communication center 15 represents a state-of-the-art service center that is capable of handling communication events arriving thereto from both networks 11 and 13. It is noted herein, although not represented in this example, that communication events sourced from either PSTN 11 or Internet 13 may be converted from connection-oriented-switched-telephony (COST) to IPNT and from IPNT to COST at a suitable network bridging station before agent-level-routing (ALR) to communication center 15.

PSTN 11 comprises a telephony switch 17 enhanced by a CTI processor 19. Processor 19 is connected to switch 17 by a CTI link as is known in the art of CTI telephony. An incoming telephony trunk 23 illustrated within PSTN 11 represents all of the lines, equipment and connections known to make up the PSTN network in a broad sense. Switch 17 is, in this example, an automated call distributor (ACD). However, any known type of telephony switching apparatus may be used.

A central telephony switch 27 is provided within communication center 15 and adapted to receive incoming communication events routed thereto from switch 17. Switch 27 is CTI-enhanced by virtue of a CTI processor 31 connected thereto by a CTI link. Communication events are routed from switch 17 to switch 27 over a telephony trunk 25. Trunk 25 may be any type of carrier line as is known in the art. Customers calling into center 15 from PSTN 11 are represented by connected telephones 21a–21c. Processor 19 functions to enhance switch 17 according to enterprise rules in effect at center 15. To this end, processor 19 has interactive voice response (IVR) capability attributed thereto for the purpose of interacting with customers arriving at switch 17 and destined to be routed to center 15.

An instance of T-server software is also provided to execute on processor 19 for the purpose of extending intelligent routing control to switch 17. T-Server is known to the inventor and provides routing control over switch 17 from within center 15. Routines known to the inventor include, but are not limited to, statistical routing, skill-based routing, predictive routing, priority routing, and other conventions. The above-mentioned routines may be used alone or in combination to provide optimum routing intelligence at network level for agent-level-routing environments.

Processor 19 in PSTN 11 and processor 31 in communication center 15 are connected to each other by a separate digital network 29, which is adapted to carry commands and information about communication events from switch 19 to switch 29 and from switch 29 to switch 19. Processor 31, like processor 19, has IVR capability as well as T-Server enhancement. In this way, specific information about communication events and customers may be passed into center 15 ahead of an actual call. Processor 31 has an instance of voice treatment option (VTO) software installed thereon and adapted to enhance IVR functionality. VTO is a programmable set of service options designed to enhance the functionality of typical IVR routines by providing broader treatment options. Typically, VTO software is customized and designed to operate according to communication center needs, which may vary accordingly. In this example, VTO software is used to present personal agent greetings (PAGs) to customers who have been internally routed within communication center 15 to their final agent destinations.

As previously described, center 15 also receives communication events from Internet 13. Internet 13 has an Internet backbone illustrated therein, which represents all of the equipment lines and connection points that make up the Internet network as a whole including connected sub-nets and the like. A communication server 35 is provided within Internet 15 and is illustrated as connected to backbone 39. Server 35 is, in this example, hosted by center 15 and functions as a contact point for customers attempting to contact center 15. Customers initiating communication events at server 35 are illustrated as computer icons labeled 37a–37c, also shown connected to backbone 39. Data connections linking customers 37a–37c represent, in this case, Internet Service Provider (ISP)-type connections as are well known in the art. However, in other embodiments, other known types of data network access may be used.

Server 35 has an IPNT version of IVR executing thereon and adapted to allow automated voice interaction with customers 37a–37c. An IPNT version of T-Server software is also installed on server 35 and provides intelligent routing for data leaving server 35 and destined for center 15. Intelligent routing routines created and executed at server 35 may mirror those routines utilized at switch 17 in PSTN 11. There may also be separate routines created for IPNT that support varying types of media used such as for e-mail and the like.

Incoming events from Internet 35 arrive at a data router (RTR) 43 provided within center 15 and connected to backbone 39 by a data line 41. Router 43 is adapted to route events to agents according to enterprise rules and routing intelligence practiced at server 35. Line 41 represents an Internet data connection, which, in a preferred, embodiment, is a continuous 24×7 connection. However, in other embodiments line 41 may be a dial-up connection.

Communication center 15 further comprises a plurality of agent stations 51, 53, and 55, provided as workstations adapted by equipment for handling both COST and IPNT communication. For example, each agent station has a telephone provided therein and illustrated as connected to switch 27 by virtue of internal telephone wiring 33. Telephone 57 resides within station 51, telephone 59 resides within station 53, and telephone 61 resides within station 55. Each agent station also has a PC/VDU provided therein with each PC/VDU illustrated as connected to a local area network (LAN) 69. These are PC/VDU 63 (station 51), PC/VDU 65 (station 53), and PC/VDU 67 (station 55). LAN 69 is adapted to carry IPNT and has continuous connection to data router 43.

In this example, a (logically) separate data link 49 is provided to connect router 43 to CTI processor 31 within center 15. Link 49 is adapted to allow data sharing between router 43 and switch 31 representing a further enhancement to communication center routing functionality. In this way information may arrive within center 15 using varied paths with information matched to actual events before final internal routing. For example, data obtained at processor 31 about a COST communication event may be utilized at router 41 for an automated e-mail response or confirmation. There are many other applications available to and known to the inventor.

As described and illustrated in this example, communication center 15 exhibits optimum capability for integrated communication and routing of communication events. In a specific sense, however, this specification will focus on a novel method for implementing PAG capability for both COST and IPNT environments. Therefore, it may be assumed in this example that agents operating at stations 51–55 are responsible for handling communication from a variety of different customers. For exemplary purposes consider that an agent operating at station 55 is answering communication for a plurality of clients representing separate businesses whose customers are ultimately routed to that same agent for service. In this case, the agent must have access to a variety of PAGs, which must be presented according to the client/business that a customer is attempting to contact. It is noted herein that such an assignment as described above may also be a temporary one where a particular agent is concerned. Therefore, new PAGs must be created and activated, in some cases on a periodic basis.

In order to accomplish the goals of the present invention, a desktop application (DA) 71 is provided to execute at each agent PC/VDU. Only one instance of DA is illustrated in this example as executing on PC/VDU 65 at station 53. However, it may be assumed that a like instance of DA 71 is installed and functional on PCNVDUs 63 (at station 51) and 67 (at station 55) as well, or any other PC/VDU used with the call center in question. DA 71 is adapted to provide assignment information to an agent upon agent log-in. A typical assignment may be that of handling all communication for United Air™, Transcontinental Air, and Express Travel for a period of two workdays. DA 71 also provides the tools required for recording and editing PAGs and storing them for subsequent use. PAGs generated with DA 71 are, in this example, stored in a network storage repository (NS) 47. NS 47 is connected to LAN 69 and to data network 49 for both agent and system accessibility.

Once an agent has recorded and configured all of his or her PAGs for use during a particular assignment, DA 71 works in the background to monitor the communication activity of the authoring agent during the period of assignment. When a communication event arrives within communication center 15 and is routed to an agent at station 53, DA 71 determines whether or not a PAG is required for the event. If one is required, then DA 71 commands VTO at processor 31 to access an appropriate PAG and play it in conjunction with IVR functionality.

There are many ways PAGs may be identified for use with a particular event. Automatic number identification (ANI) and destination number identification service (DNIS) techniques may be used to automatically identify the origin and destination of an event as known in the art. Additionally, standard IVR treatment practiced in PSTN 11 may be used to obtain additional information about an event before final routing.

To further illustrate a COST scenario using the agent assignment and agent station described above, consider that a communication event arrives at switch 17 from customer 21c. At switch 17, DNIS is determined to be switch 27 within center 15. Processor 19 prompts customer 21c with a choice of businesses or services available by virtue of standard IVR technology. It is determined at this stage that customer 21c is attempting to make flight reservations through Express travel (one of the companies handled at station 53). When the event initiated by customer 21c arrives at switch 27, the final routing determination (route to station 53) is known. When the event is routed to the agent operating station 53, DA 71 notifies a VTO at processor 31 to play the appropriate PAG for Express travel to the customer and the agent at or near the time of pick-up. The agent has time to compose himself before continuing with customer 21c. The PAG selection process is entirely automated and transparent to the agent at station 53.

Considering an example wherein an event is sourced from Internet 13, assume that customer 37c initiates an IP call (by mouse click) through server 35 to center 15 from a contact page hosted in server 35. At this point, IVR technology hosted in server 35, or some other on-line interaction function may prompt user 37c to indicate a preference from a series of options. If voice recognition is used, a choice is entered based on customer voice response, which must be enabled (firmware and software) at the customer end. In another embodiment, an online submission form (more common) may be used.

Assume that a choice made by customer 37c is currently being handled at station 55. In this case, the IP call and data about the call is routed to RTR 43, which understands to route the event to station 55 over LAN 69 upon receipt. VTO software is illustrated as provided at station 55 in this example to indicate an IPNT option. VTO at station 55 retrieves an appropriate PAG from NS 47 for presentation to customer 37c once connection has been established. VTO, as illustrated on PC/VDU 67 may also be implemented on PC/VDU 65 (station 53), and at PC/VDU 63 (at station 51). In another embodiment, VTO treatment may be handled in router 43 instead of locally (at an agent station).

In each represented case, selection of a PAG is automated and achieved according to pre-known information about a communication event. In addition to a standard PAG for incoming events, agents may create PAGs to be used in outbound campaigns. An incoming PAG example may be "Good morning, Express travel. This is Joe. How may I be of service today?" An outbound PAG may be "Good afternoon, this is Joe calling from Express travel to confirm your reservation for a Friday departure". Subtleties such as time of day (morning or afternoon) may be configured in to DA 71 for separate PAGs causing a morning PAG to switch to an afternoon PAG depending on system knowledge of the current time. Similar considerations may be made for day of the week and other system-known parameters. The only requirement of an agent is to create and configure his or her own PAGs according to current assignment.

It will be apparent to one with skill in the art that communication center 15 may be an answering service for many client/businesses and that many agents operating PAG according to embodiments of the present invention may be given periodic and specific communication assignments. Individual instances of DA assigned at each agent station provide system/agent-identifiable sets of PAGs for use during the duration of their respective assignments. In some embodiments, additional functionality provides VTO activation of a "loud whisper" that may be selected and sent to an agent during an interaction. A loud whisper is an audible system-notification piped to an agent during an active call such that only the agent can hear it. Agents may create and configure a loud whisper by using DA 71 and store it for automated use when appropriate. A loud whisper may be "Mr. Jensen is a VIP customer. Treat with care." A loud whisper may be configured in much the same way as a PAG except that it is generally more personalized to an actual customer.

In still another example, one agent may be assigned to temporarily handle calls for another agent from another location. In this case, the inactive agent's calls are forwarded to a new DN (that of the replacement agent). A PAG for this circumstance may be "Hello, you have reached Frank's office phone at United Air. Frank is temporarily unavailable. This is Steve. How may I help you today?" In many cases, generic PAGs may simply be edited slightly to create new PAGs. There are many possibilities.

Figure 2:
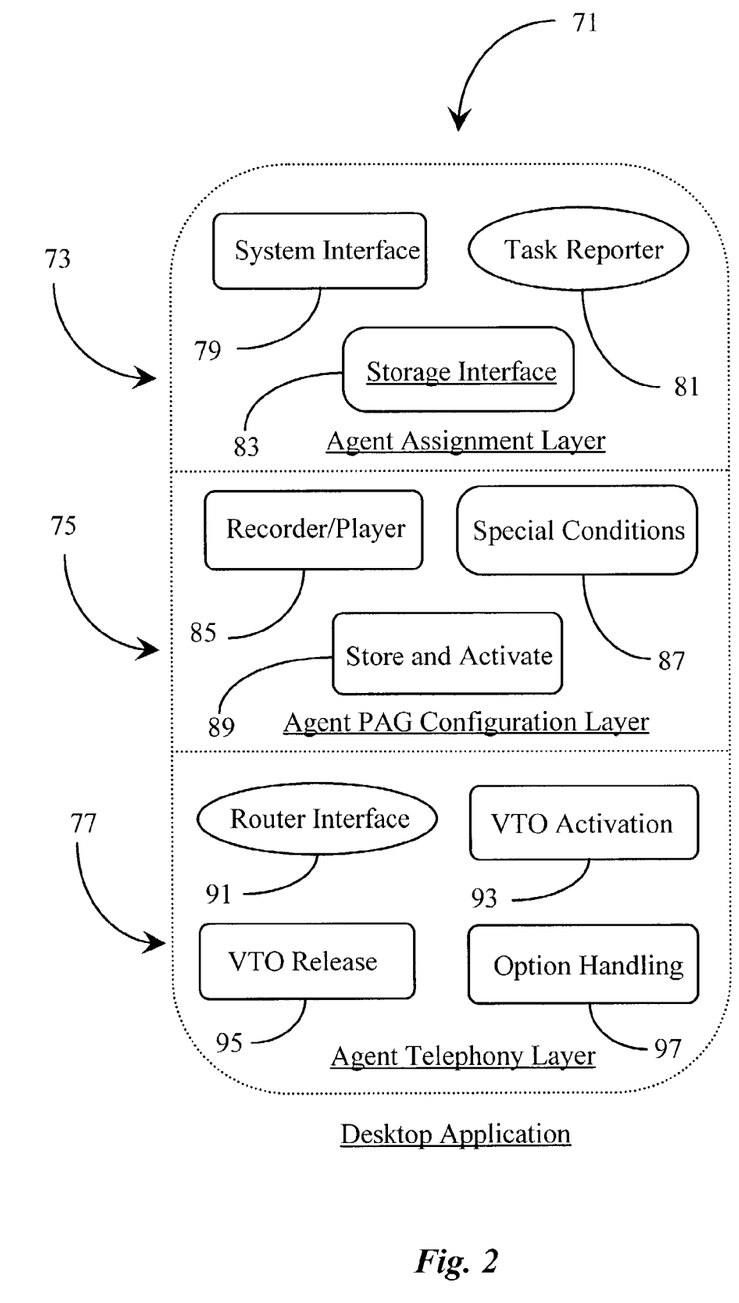
FIG. 2 is a block diagram illustrating functionality of an agent-desktop application for driving personalized agent greetings according to a preferred embodiment of the present invention.

FIG. 2 is a block diagram illustrating functionality of desktop application 71 of FIG. 1 for driving personalized agent greetings according to an enhanced embodiment of the present invention. DA 71 comprises at least three software layers. These are an agent assignment layer 73, an agent PAG configuration layer 75, and an agent telephony layer 77.

Providing DA 71 to drive a VTO-enhanced PAG system enables the PAG process to be simplified and reduces expenses. It is noted herein that in a simple embodiment PAGs are IVR driven with VTO enhancement wherein VTO controls are held in a local network within a communication center and have access to routing intelligence. A preferred embodiment utilizes DA 71 to give an agent more control and to reduce strain on network resources. At least three examples of VTO-enhanced PAG implementation will be provided later in this specification.

Layer 73 is responsible for informing an agent of current assignments when an agent logs on to the system. A system interface module 79 is provided within layer 73 and is adapted to allow a system administrator to create and route current assignments to an agent. An assignment includes a list of communication-center clients for whom the agent is expected to answer events for. An assignment also includes a designated period or periods of time during which the agent is expected to be active in the assignment. An assignment may include different periods for different clients.

A task reporting module 81 is provided within layer 73 and is adapted to allow an agent to visualize and organize a task including ascertaining and obtaining any system data or parameters that may be used to help configure PAGs according to assignment. For example, module 81 may be used to fetch system statistics in conjunction with module 79 that may shed additional information about what content should be included in a PAG. For example, if calls to a certain business included in an assignment are made from a different time zone, then an agent may use that information in creating a PAG. Therefore, a PAG to that business may indicate "Good afternoon" even though it is morning at the location of the communication center. A storage interface module 83 is provided within layer 73 and adapted to allow an agent to browse previous PAGs that may be archived to determine if existing PAGs may be used with slight editing.

Layer 75 provides a means for PAG creation and configuration. A digital recorder/player application 85 is provided within layer 75 and adapted to allow an agent to completely author a new PAG or to edit an existing PAG for new use. PAGs may be created in any supported format such as in the well-known Wav format. In some embodiments, a PAG may be an audio and video file such as AVI or MPEG if the technology is supported at a communication center and by customers calling into the communications center. For example, an IP caller may receive a video/audio PAG if he or she is using an appliance that the system determines is capable of receiving it. One applicable appliance would be a DNT videophone application.

A special conditions module 87 is provided and adapted to allow an agent to program special triggers to certain PAGs. One example would be to include a specific loud whisper along with the general PAG for customers calling a certain business if pre-known account history statistics show a past activity above a certain threshold. The loud whisper may be "Set this customer up as a new VIP account". Or perhaps it could be "Offer this customer an additional 10% discount". There are limitless possibilities. The functional options available through module 87 are limited only by pre-knowledge about caller information and the extent of detail used in identifying the source of an event.

A "store and activate" module 89 is provided within layer 75 and adapted to allow an agent to store completed PAGs gathered and packaged for an assignment. An agent may also program the system to activate or deactivate through the activate/deactivate feature of module 89. For example, if an agent has pre-knowledge of a required meeting that is to take place during his assignment period, then he may program the system to deactivate during that period. In some embodiments, an agent may program the system to switch to another set of PAGs personalized to another agent if there is a temporary agent swap at one station during an assignment period. For example, if two agents are working on a same assignment in pre-planned shifts from one destination number, then the appropriate PAGs will play at the designated time periods assigned to each agent at the station.

PAGs are recorded in an agent's own voice and are, in a preferred embodiment, personalized to specific agents as described above. However, more generalized PAGs may be used that are personalized only to client/businesses for whom agents are answering calls for. In this case, instead of specifically identifying a particular agent to a customer a PAG may be "Welcome to Express travel services". "Your agent dedicated to assisting you with your immediate business is . . .". At that point in the PAG, whoever is connected to the customer may simply state his or her name and then ask, "How can I help you?" to facilitate a smooth transition from PAG to live interaction.

Layer 77 is a telephony layer. Layer 77 works in the background to monitor agent activity and to drive PAG selection according to system rules and data about an event. A router interface module 91 is provided within layer 77 and adapted to monitor final routing points such as switch 27 and router 43 of FIG. 1. Module 91 detects impending events and obtains all pertinent data related to each event for the purpose of VTO activation. Module 91 has the capability of determining which impending events require a PAG. Data associated with events is used to determine which PAG to play.

A VTO activation module is triggered by module 91 in the case of an event requiring a PAG. VTO software selects an appropriate PAG based on pre-known information and plays it using IVR technology at the time of call connection such that both a customer and an agent hear it. VTO software may also select and play a loud whisper for benefit of an agent. After a PAG has executed during a call and has completed, a VTO release module 95 releases VTO/IVR involvement. Interaction resumes between a customer and an agent. An option-handling module 97 is provided within layer 77 and adapted to allow an agent to transfer a connected call to any available automated services. Information about a communication event obtained during pre-routing may be used to help configure any automated responses.

The entire function of layer 77 is automated and transparent to an agent such that an agent does not have to manually select PAGs or otherwise become involved in the process other than just conversing with a customer after a PAG has executed and is complete. An exception is option-handling module 97, which is executed by an agent if decided upon during customer interaction. Module 97 is not required to practice the present invention but is illustrated herein as a convenient desktop routing-tool.

In one embodiment of the present invention, an IVR-driven PAG system is provided wherein VTO controls are network driven, an agent pre-records his or her own PAGs, which can automatically be played to a customer using IVR functionality. However, without benefit of an agent desktop-application (DA) to drive the process, an IVR unit must initiate a conference call to an agent, play the PAG and then hang up. Therefore committed ports must be used. Such an embodiment is detailed below.

Figure 3:
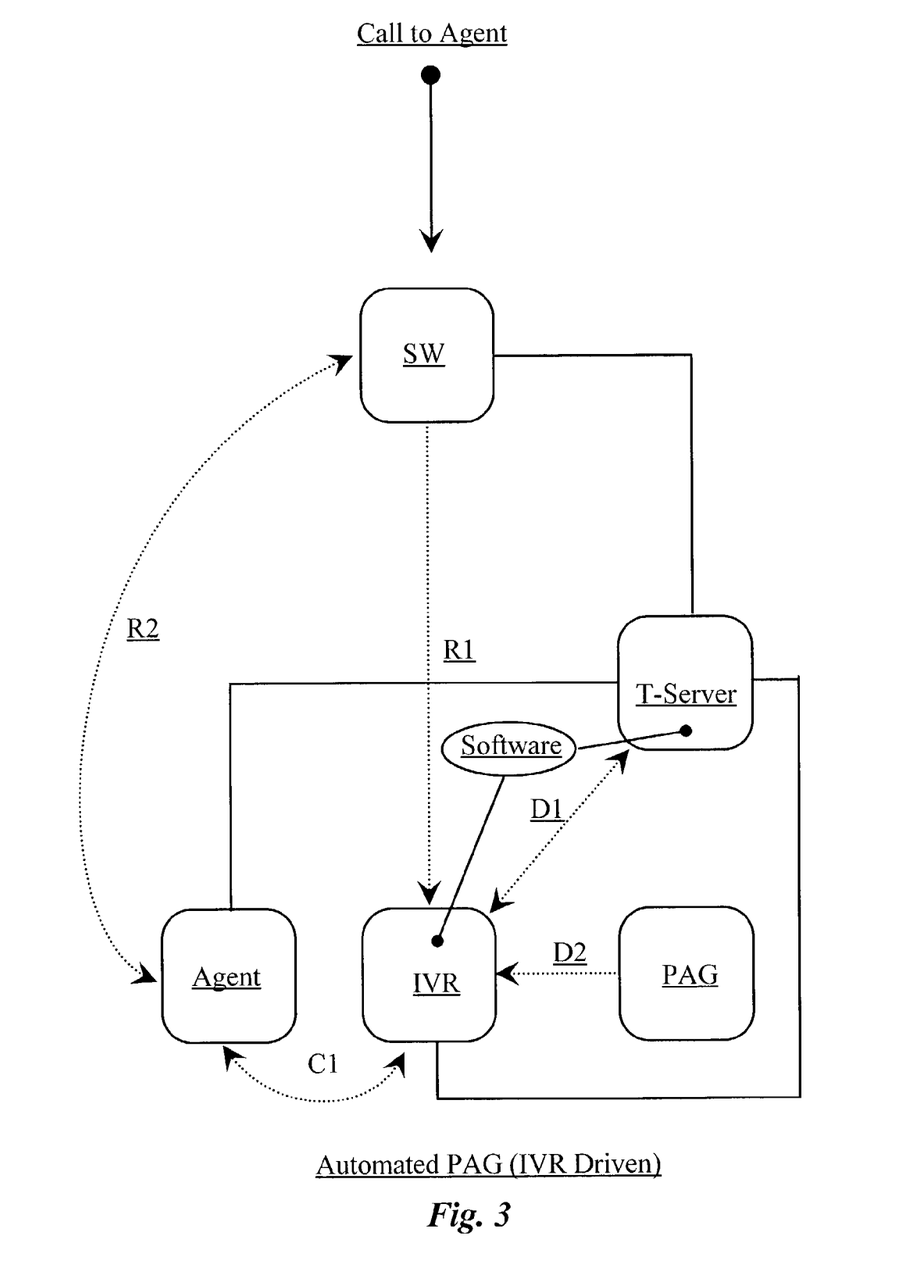
FIG. 3 is a block diagram illustrating functionality of an IVR-driven application for driving personalized agent greetings according to an alternate embodiment of the present invention.

FIG. 3 is a block diagram illustrating functionality of an IVR driven application for driving personalized agent greetings according to an alternate embodiment of the present invention. In this example, a central switch, analogous to switch 27 of FIG. 1, is represented by a rounded box labeled SW. A rounded box labeled T-Server and a rounded box labeled IVR illustrate separate instances of VTO-enhanced software. In FIG. 1 these instances (T-Server and IVR) are illustrated as running on a same processor (31). However, in this example the functionality is logically separated for illustrative purpose only. A rounded box labeled Agent represents an agent workstation such as was described in FIG. 1 (stations 51, 53, or 55). A rounded box labeled PAG represents a repository containing PAGs, that are accessible to IVR software. In further description of the above-listed elements or components, they will be referred to simply by label.

Solid lines connecting each of the components represented in this example denote LAN connectivity and CTI connectivity between illustrated components. In this example, VTO-enhanced software represented by an ellipse labeled Software, works in conjunction with IVR function and T-server function as illustrated by placement lines leading from Software and ending at T-Server and IVR. For example, VTO and IVR software is integrated at IVR, while VTO control function is integrated with T-Server. For the purpose of clarity, T-Server and IVR may be thought of, abstractly, as two separate physical processing units each dedicated to performing respective software function. However, in actual practice, these components may execute on a single processing unit (CTI processor). It is enough to indicate that the software of the present invention may be distributed over more than one processor, or may be combined to execute on one processor.

Referring now to FIG. 3, an incoming call represented herein by a vector labeled Call to Agent, arrives at SW and is immediately routed to IVR as illustrated by a dotted arrow labeled R1, which represents internal telephony wiring. T-Server determines that a PAG is required for this call and commands VTO-enhanced IVR to select a PAG based on pre-known information about the call, which is available from T-Server. This data exchange is logically illustrated by a dotted double-arrow labeled D1. IVR then initiates a conference call to Agent as illustrated by a dotted, double-arrow arc labeled C1. Once C1 is established, T-Server routes the call directly to Agent as indicated by a double-arrow arc labeled R2 (telephony wiring) and R1 is released. An appropriate PAG is retrieved from network storage (NS) as is illustrated by a dotted arrow labeled D2, and played over connection C1. After the PAG executes and completes, C1 is released by IVR.

In this COST example, Agent has no DA (71) for driving the process as was described in FIGS. 1 and 2. Automatic PAG selection according to pre-known information is performed in the network (T-Server) in cooperation with VTO-enhanced IVR.

Figure 4:
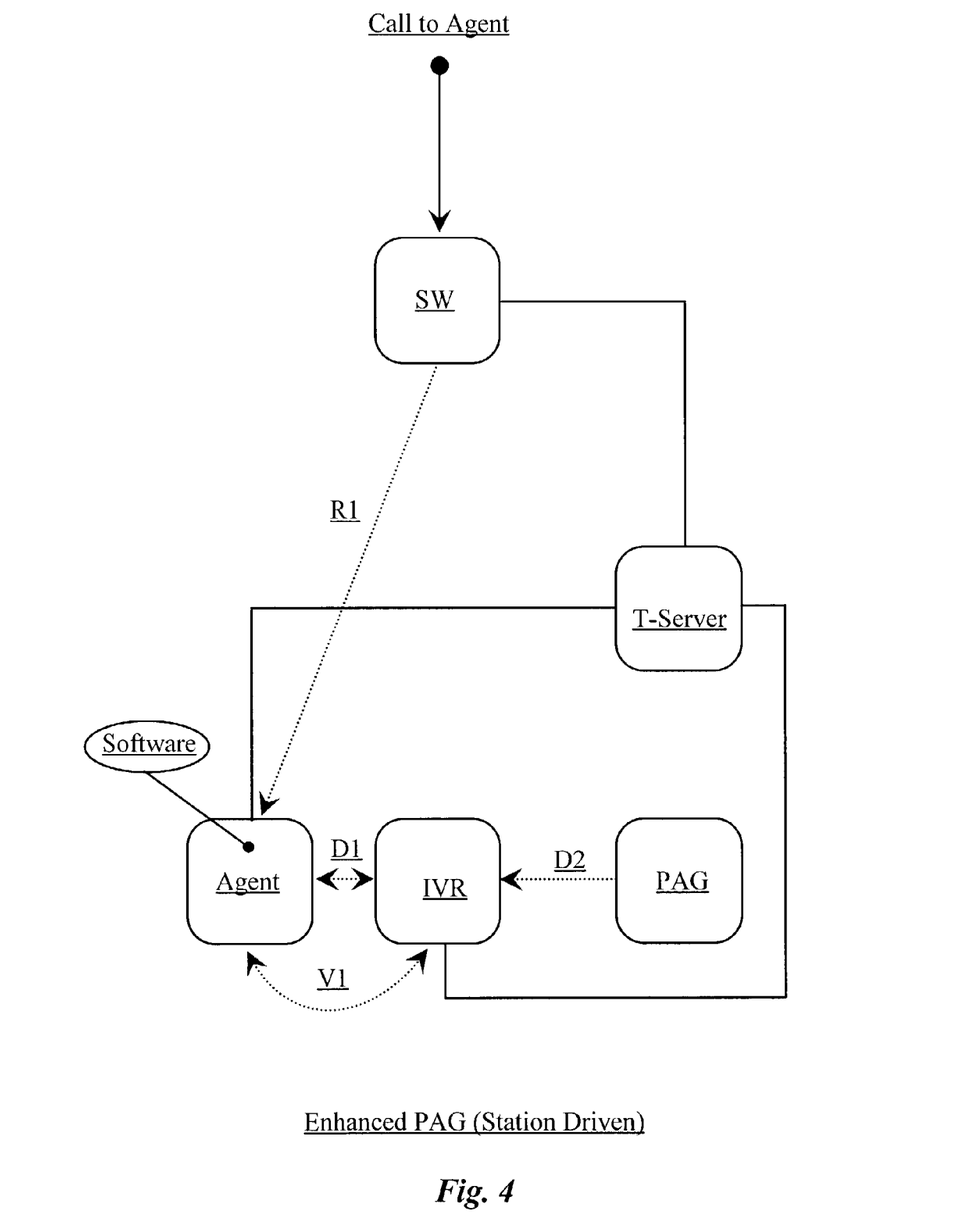
FIG. 4 is a block diagram illustrating functionality of a desktop driven application for driving personalized agent greetings according to an enhanced embodiment of the present invention.

FIG. 4 is a block diagram illustrating improved functionality of a desktop-driven application for driving personalized agent greetings according to an enhanced embodiment of the present invention. In this example, the components are the same as in FIG. 3 except that VTO control resides at Agent in the form of a desktop application as described in FIG. 2. Provision of a DA simplifies routing and provides more agent control. The process is described as follows.

Call to Agent arrives at SW as described and represented in FIG. 3. However, instead of routing to IVR as in FIG. 3, the call is routed directly to Agent as illustrated by a dotted arrow labeled R1. Software in this embodiment is located at IVR (VTO+IVR) with VTO control residing at Agent and a part of a DA as described above and as indicated by the placement lines leading from Software and ending at IVR and Agent respectively. Software residing at Aent initiates a consult call to IVR illustrated by dotted arc V1. During this process, command data related to which PAG to pull is also transferred to IVR as illustrated by a dotted double-arrow labeled D1. VTO enhancement at IVR then selects and pulls the appropriate PAG as illustrated by a dotted arrow labeled D2. The PAG is played over V1. After the PAG has executed and is complete, Agent releases V1.

It will be apparent to one with skill in the art that the embodiment of FIG. 4 uses less network resource than the embodiment of FIG. 3. Essentially, control over VTO enhancement is removed from the network and placed with the agent. In addition to using less network resource, a DA providing control from an agent's workstation enables an agent to have more personal control over the entire process.

In still another COST embodiment (not illustrated), hardware may be implemented at an agent's station that acts to bridge an agent's COST telephone capability with his or here IPNT capability by adding an adaptive cable connection between a COST telephone and a PC sound-card installed on an adjacent LAN-connected PC/VDU. The connection is achieved through adaptive cabling from telephone circuitry to PC sound-card circuitry. This configuration is known to the inventor and allows integration of IPNT voice files into a COST conversation. In this case, VTO software may be installed at the agent's station along with digital IVR functionality. When a COST call is routed from (SW) to (Agent) in this scenario, VTO software can pull a PAG directly from storage anywhere on the network (NS) and play the file on an agents PC/VDU such that a connected COST customer and agent using IPNT may hear it without involving an actual IVR or VTO port. In this sense, VTO-enhanced PAG implementation may be described as a virtual or simulated implementation that further reduces strain on network resource. Yet another example of virtual VTO-enhanced PAG implementation for IPNT is detailed below.

Figure 5:
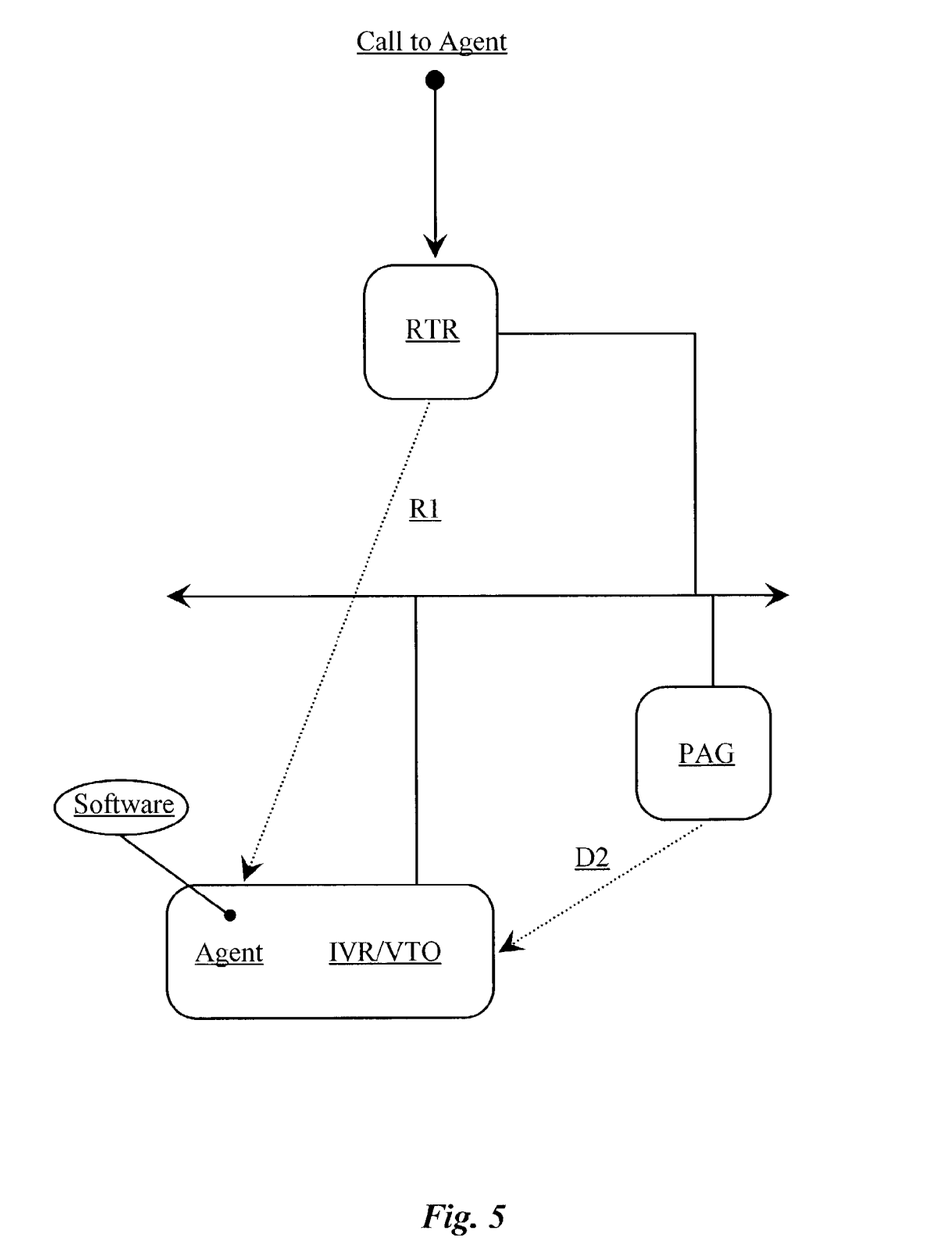
FIG. 5 is a block diagram illustrating a virtual personalized agent greeting application for IPNT according to yet another embodiment of the present invention.

FIG. 5 is a block diagram illustrating a virtual personalized agent greeting application for IPNT according to still another embodiment of the present invention. In this example, a Call to Agent arrives at an IP router illustrated by a rounded box labeled RTR instead of a SW as in previous examples. Also in this case, VTO-enhanced IVR function and control thereof resides within Agent as part of a DA. Therefore, the call is routed from RTR to Agent as illustrated by a dotted arrow labeled R1. R1 is shown logically here and represents LAN connectivity.

IVR and T-Server capability at network level (see server 35 FIG. 1) obtains and /or provides sufficient customer identification, business/client identification, and any other needed data about the call. Additional data is passed along with the actual call over a shared-bandwidth connection directly to Agent over R1 as previously described. Therefore, in this embodiment T-Server functionality described as local within a communication center is not required in an IPNT environment. Nor is traditional IVR functionality. The entire process of call identification, PAG selection, and PAG execution is performed at Agent. Again, VTO/IVR function is virtual and does not require traditional hardware as was described in the COST/IPNT example described previously.

It will be apparent to one with skill in the art that the ability to integrate call identification techniques, intelligent routing routines, and VTO-enhanced IVR functionality provides a system for selecting and playing PAGs that is far superior to prior art methods. For example, without utilizing VTO, a PAG system can only play one fixed PAG or prompt and agent to select an appropriate PAG each time a call arrives.

In the four embodiments described above, there can be multiple PAGs available with selection being automated at run time (time of call-connect). In actual practice of the present invention, a combination of the above-described embodiments may be implemented within a communication center. The method and apparatus may be practiced in a COST-only center, a dually-capable center, or in an IPNT-only center. Moreover, in some embodiments loud whispers representing pre-conditioned agent-notification events may be triggered to accompany certain PAGs to certain customers.

The method and apparatus of the present invention should be afforded the broadest possible scope under examination. The spirit and scope of the present invention is limited only by the claims that follow.

What is claimed is:

1. A system for aiding an agent at a station in responding to callers, comprising:
   a data repository coupled to the station comprising information about callers; and
   a call routing and response system for receiving calls, identifying callers, routing calls to the agent and others, and retrieving and providing information about individual ones of the callers;
   wherein the call routing and response system receives a call, identifies the caller, selects information about the caller from the repository according to pre-programmed rules, routes the call to the agent's station, and provides the information to the agent during a live call with the caller as a whispered audio audible to the agent but not to the caller.

2. The system of claim 1 wherein the data repository additionally stores personal greetings recorded by the agent, and wherein the system selects, according to pre-programmed criteria, an individual one of the personal greetings and plays the personal greeting, audible to both the caller and the agent, immediately after the routed call is connected to the agent's station.

3. A method for aiding an agent at a station in responding to callers, comprising the steps of:
   (a) storing information about callers in a data repository coupled to the station; and
   (b) by a call routing and response system, receiving a call, identifying the caller, selecting information about the caller from the repository according to pre-programmed criteria, routing the call to the agent's station, and providing the information to the agent during a live call with the caller as a whispered audio audible to the agent but not to the caller.

4. The method of claim 3 comprising a step wherein the data repository additionally stores personal greetings recorded by the agent, and wherein the system selects, according to pre-programmed criteria, an individual one of the personal greetings and plays the personal greeting, audible to both the caller and the agent, immediately after the routed call is connected to the agent's station.

* * * * *